United States Patent [19]

Pfaendner et al.

[11] Patent Number: 6,025,463
[45] Date of Patent: Feb. 15, 2000

[54] INCREASING THE MOLECULAR WEIGHT OF POLYAMIDES

[75] Inventors: Rudolf Pfaendner, Rimbach; Heinz Herbst, Heppenheim; Kurt Hoffmann, Wachenheim, all of Germany

[73] Assignee: Ciba Specialty Chemicals Corporation, Tarrytown, N.Y.

[21] Appl. No.: 09/125,179

[22] PCT Filed: Feb. 4, 1997

[86] PCT No.: PCT/EP97/00494

§ 371 Date: Apr. 22, 1999

§ 102(e) Date: Apr. 22, 1999

[87] PCT Pub. No.: WO97/30106

PCT Pub. Date: Aug. 21, 1997

[30] Foreign Application Priority Data

Feb. 15, 1996 [CH] Switzerland ............................ 391/96

[51] Int. Cl.$^7$ ..................................................... C08F 6/00
[52] U.S. Cl. ............................ 528/487; 524/99; 524/115; 524/130; 525/419; 525/420; 528/310; 528/322; 528/480; 528/492
[58] Field of Search ..................................... 528/310, 322, 528/487, 480, 492; 525/419, 420; 524/99, 115, 130

[56] References Cited

U.S. PATENT DOCUMENTS

| | | |
|---|---|---|
| 5,496,920 | 3/1996 | Pfaendner et al. ...................... 528/487 |
| 5,756,596 | 5/1998 | Pfaendner et al. ...................... 525/423 |

FOREIGN PATENT DOCUMENTS

| | | |
|---|---|---|
| 0604367 | 6/1994 | European Pat. Off. . |
| 0628588 | 12/1994 | European Pat. Off. . |
| 95/24438 | 9/1995 | WIPO . |

OTHER PUBLICATIONS

Ullmann's Encyclopedia of Industrial Chemistry, 5$^{th}$ Completely Revised Ed., vol. A21, pp. 187–189.

Gächter et al, Plastics Additives Handbook, 3$^{rd}$ Ed., pp. 43–45.

*Primary Examiner*—Terressa M. Boykin
*Attorney, Agent, or Firm*—Luther A. R. Hall

[57] ABSTRACT

By heating at above the melting point or glass transition point of the polyamide and adding a secondary aromatic amine and a difunctional epoxide it is possible to bring about an increase in the molecular weight and/or viscosity of virgin polyamide and recycled polyamide.

12 Claims, No Drawings

INCREASING THE MOLECULAR WEIGHT OF POLYAMIDES

The invention relates to a process for increasing the molecular weight and/or viscosity of polyamides and to the polyamides obtainable by the process.

Polyamides are important thermoplastic materials from the engineering plastics group with high strength, rigidity, hardness and heat deformation resistance and a wide variety of potential uses, for example in the form of films, bottles, fibres and injection mouldings. The industrial preparation of polyamides by means of polycondensation reactions leads to polymer chains having functional end groups. Similarly, damage to such polyamides as a result of processing and use leads, owing to chain cleavage, to polymer fragments containing functional end groups.

The mechanical and physical properties are crucially dependent on the molecular weight of the polymer. High-grade recycling of used polyamides and of production waste, for example from fibre production and injection moulding, is only possible to a restricted extent without aftertreatment, owing to the reduced molecular weight. For certain applications, there is also a demand for virgin polyamides of high molecular mass, whose synthesis is difficult or relatively complex.

Increasing the molecular weight of polycondensation polymers such as, for example, polyamides is known in principle. For example, post-condensation in the solid state ("solid state polycondensation") is possible, as is described in "Ullmann's Encyclopedia of Industrial Chemistry Vol. A 21, 5th Edition", page 188 (1992) and is also practised industrially. An alternative method is to build up the molecular weight by means of reactive additives, which is referred to in general as chain extension.

EP-A-0 604 367 discloses a process for increasing the molecular weight of polyamides, which comprises heating a polyamide, with the addition of a polyfunctional epoxy resin and of a sterically hindered hydroxyphenyl-alkyl-phosphonic ester or monoester, at above the melting point or glass transition point of the polyamide.

U.S. Pat. No. 5,496,920 likewise discloses a process for increasing the molecular weight of polyamides, which comprises heating a polyamide, with the addition of a bismaleimide and of a sterically hindered hydroxyphenyl-alkyl-phosphonic ester or monoester at above the melting point or glass transition point of the polyamide.

Among the polyfunctional epoxy resins, a broad selection of commercial products is available. From an economic standpoint, therefore, such epoxides therefore appear particularly appropriate for these reactions. So that the concentration in which they are used can be kept low, difunctional epoxides with a high epoxide content are expedient. Commercial difunctional epoxides of high epoxide content are frequently liquid or low-melting products, whereas the abovementioned sterically hindered hydroxyphenyl-alkyl-phosphonic esters or monoesters are solids. The simultaneous addition of solid and liquid components in connection with increasing the molecular weight of polyamides gives rise to technical problems which can be solved only with complex technical apparatus.

The object of the present invention, therefore, was to provide a system for building up the molecular weight of polyamides, which is highly effective and consists preferably of liquid or homogeneously miscible components, which components are obtainable at economically acceptable expense.

It has now surprisingly been found that a mixture comprising a secondary aromatic amine and a difunctional epoxide is suitable for increasing the molecular weight and/or viscosity of virgin polyamide or recycled polyamide.

The present invention therefore provides a process for increasing the molecular weight and/or viscosity of polyamides, which comprises heating a polyamide, with the addition of a secondary aromatic amine and of a difunctional epoxide, at above the melting point or glass transition point of the polyamide.

The term polyamides, i.e. both virgin and recycled polyamides, refers to aliphatic and aromatic polyamides or copolyamides which are derived from diamines and dicarboxylic acids and/or from aminocarboxylic acids or their corresponding lactams. Examples of suitable polyamides are: PA 6, PA 11, PA 12, PA 46, PA 66, PA 69, PA 610 or PA 612, and also amorphous polyamides of the type Trogamid PA 6-3-T and Grilamid TR 55. Polyamides of the type mentioned are generally known and commercially available.

The invention acquires particular significance in connection with recycled polyamide as obtained with production wastes or collections of recyclable material, or through so-called obligatory takeback schemes, for example in the automotive industry or in the electrical sector. Such recycled polyamide has undergone a wide variety of thermal and/or hydrolytic damage. This material may in principle constitute the polyamides already indicated above; however, depending on the type of collection involved, mixtures—for example of polyamide 6 and polyamide 6.6—can also be employed. Furthermore, this recycled material—recyclate—may also, in minor amounts, include admixed plastics with different structures, such as, for example, styrene polymers (ABS, ASA), polyesters or polyolefins, for example polyethylene, as well as customary impurities, such as residues of coating material, traces of metal, residues of fuel, ethylene glycol, isopropanol or else traces of water.

Polyamides preferably employed are PA 6 and PA 6.6 or mixtures thereof, and also recyclates based on them.

The present novel process for increasing the molecular weight and/or viscosity of polyamides is particularly suitable for virgin polyamides for particular sectors, for example injection-moulding or extrusion applications. Polyamide 6 and polyamide 6.6 are particularly preferred.

Preference is given to the novel process for increasing the molecular weight and/or viscosity of polyamides where both the secondary aromatic amine and the difunctional epoxide are in liquid form.

Secondary aromatic amines are, for the purposes of this invention, preferably compounds of the formula I

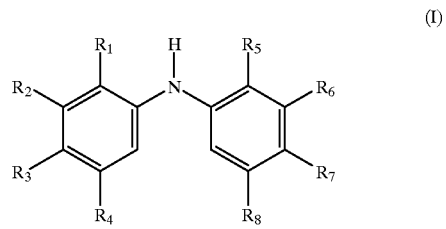

(I)

in which $R_1$ is hydrogen or $C_1$–$C_{25}$alkyl, $R_2$ is hydrogen, $C_1$–$C_{25}$alkyl or benzyl, $R_3$ is hydrogen, $C_1$–$C_{25}$alkyl, $C_5$–$C_{12}$cycloalkyl, benzyl, α-methylbenzyl or α,α-dimethylbenzyl;

or $R_2$ and $R_3$ together form a divalent group

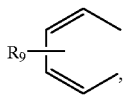

$R_4$ is hydrogen, $C_1$–$C_{25}$alkyl or benzyl,
$R_5$ is hydrogen or $C_1$–$C_{25}$alkyl,
$R_6$ is hydrogen, $C_1$–$C_{25}$alkyl or benzyl,
$R_7$ is hydrogen, $C_1$–$C_{25}$alkyl, $C_5$–$C_{12}$cycloalkyl, benzyl, α-methylbenzyl, α,α-dimethylbenzyl

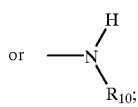

or $R_6$ and $R_7$ together form a divalent group

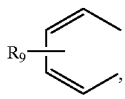

$R_8$ is hydrogen, $C_1$–$C_{25}$alkyl or benzyl,
$R_9$ is hydrogen or $C_1$–$C_{25}$alkyl, and
$R_{10}$ is $C_5$–$C_{12}$cycloalkyl,

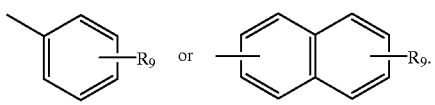

Alkyl of up to 25 carbon atoms is a branched or unbranched radical such as, for example, methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl. One of the preferred definitions of $R_1$, $R_2$, $R_4$, $R_5$, $R_6$ and $R_8$ is for example $C_1$–$C_{18}$alkyl, especially $C_1$–$C_{12}$alkyl, for instance $C_1$–$C_8$alkyl. A preferred definition of $R_3$ and $R_7$ is for example $C_1$–$C_{18}$alkyl, especially $C_1$–$C_{12}$alkyl, for instance $C_4$–$C_{12}$alkyl. A particularly preferred definition of $R_3$ and $R_7$ is $C_4$–$C_{10}$alkyl, especially $C_4$–$C_8$alkyl, for instance tert-butyl or tert-octyl.

$C_5$–$C_{12}$cycloalkyl is, for example, cyclopentyl, cyclohexyl, cycloheptyl, cyclooctyl, cyclodecyl or cyclododecyl. A preferred definition of $R_3$, $R_7$ and $R_{10}$ is for example $C_5$–$C_8$cycloalkyl, especially $C_5$–$C_7$cycloalkyl, for instance cyclohexyl.

Particularly preferred compounds of the formula I are those in which
$R_1$ and $R_2$ independently of one another are hydrogen or $C_1$–$C_{18}$alkyl,
$R_3$ is hydrogen, $C_1$–$C_{18}$alkyl, $C_5$–$C_8$cycloalkyl, benzyl, α-methylbenzyl or α,α-dimethylbenzyl, or $R_2$ and $R_3$ together form a divalent group

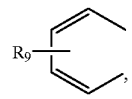

$R_4$, $R_5$ and $R_6$ independently of one another are hydrogen or $C_1$–$C_{18}$alkyl,
$R_7$ is hydrogen, $C_1$–$C_{18}$alkyl, $C_5$–$C_8$cycloalkyl, benzyl, α-methylbenzyl, α,α-dimethylbenzyl

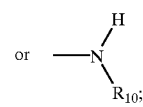

or $R_6$ and $R_7$ together form a divalent group

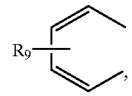

$R_8$ and $R_9$ independently of one another are hydrogen or $C_1$–$C_{18}$alkyl, and
$R_{10}$ is $C_5$–$C_8$cycloalkyl,

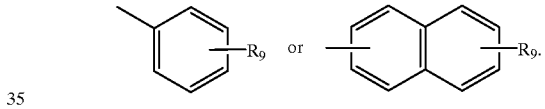

Of particular interest are the secondary aromatic amines of the formula I in which $R_1$, $R_4$, $R_5$, $R_6$ and $R_8$ are hydrogen.

Of specific interest are the compounds of the formula I in which
$R_1$ and $R_2$ are hydrogen,
$R_3$ is hydrogen, $C_4$–$C_{12}$alkyl, cyclohexyl, benzyl, α-methylbenzyl or α,α-dimethylbenzyl; or $R_2$ and $R_3$ together form a divalent group

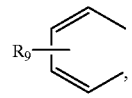

$R_4$, $R_5$ and $R_6$ are hydrogen,
$R_7$ is hydrogen, $C_4$–$C_{12}$alkyl, cyclohexyl, benzyl, α-methylbenzyl or α,α-dimethylbenzyl or

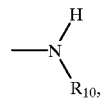

$R_8$ and $R_9$ are hydrogen, and
$R_{10}$ is cyclohexyl, phenyl or β-naphthyl.

Very particular preference is given to the secondary aromatic amines of the formulae Ia, Ib, Ic, Id, Ie and If.

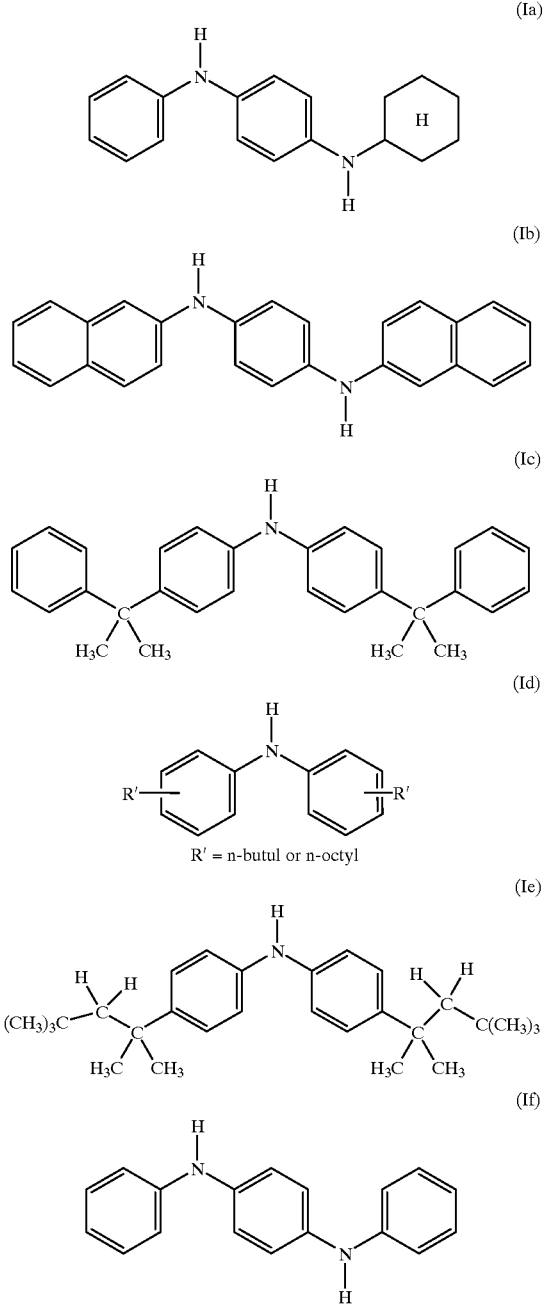

As secondary aromatic amines, specific preference is given to the compounds of the formulae Ie [4,4'-di-tert-octyldiphenylamine, Irganox® 5057 (Ciba-Geigy)] and If [N,N'-diphenyl-p-phenylenediamine] and to the compounds of the formula I in which
$R_1$, $R_2$, $R_4$, $R_5$, $R_6$ and $R_8$ are hydrogen,
$R_3$ is hydrogen or $C_8$alkyl,
$R_7$ is $C_8$alkyl or

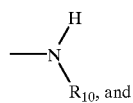

$R_{10}$ is phenyl.

The compounds of the formula I are known; some of them are commercially available or can be prepared as described in R. Gächter and H. Müller, Hanser Verlag, "Plastics Additives Handbook, 3rd Ed.", page 44 to 45 (1990), in analogy to the literature references cited therein.

For the purposes of this invention, difunctional epoxides can have an aliphatic, aromatic, cycloaliphatic, araliphatic or heterocyclic structure; they include epoxide groups as side groups, or these groups form part of an alicyclic or heterocyclic ring system. The epoxide groups are preferably attached as glycidyl groups to the remainder of the molecule by way of ether or ester linkages, or the compounds involved are N-glycidyl derivatives of heterocyclic amines, amides or imides. Epoxides of these types are generally known and commercially available.

The epoxides comprise two epoxide radicals, for example those of the formula II

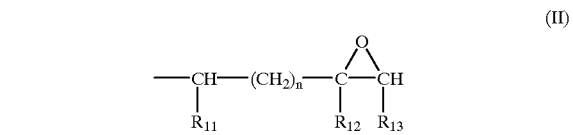

which are attached directly to carbon, oxygen, nitrogen or sulfur atoms, and wherein $R_{11}$ and $R_{13}$ are both hydrogen, $R_{12}$ is hydrogen or methyl and n is 0; or wherein $R_{11}$ and $R_{13}$ together are —$CH_2CH_2$— or —$CH_2CH_2CH_2$—, $R_{12}$ is then hydrogen, and n is 0 or 1.

Examples of epoxides are:

1. Diglycidyl and di(β-methylglycidyl) esters obtainable by reacting a compound with two carboxyl groups in the molecule and epichlorohydrin and/or glycerol dichlorohydrin and/or β-methylepichlorohydrin. The reaction is expediently carried out in the presence of bases.

As compounds of two carboxyl groups in the molecule, aliphatic dicarboxylic acids can be used. Examples of these dicarboxylic acids are glutaric acid, adipic acid, pimelic acid, suberic acid, azelic acid, sebacic acid or dimerized or trimerized linoleic acid.

It is however also possible to employ cycloaliphatic dicarboxylic acids such as, for example, tetrahydrophthalic acid, 4-methyltetrahydrophthalic acid, hexahydrophthalic acid or 4-methylhexahydrophthalic acid.

Furthermore, aromatic dicarboxylic acids, for example phthalic acid or isophthalic acid, can be used.

2. Diglycidyl, or di(β-methylglycidyl) ethers obtainable by reacting a compound with two free alcoholic hydroxyl groups and/or phenolic hydroxyl groups and a suitable substituted epichlorohydrin under alkaline conditions, or in the presence of an acidic catalyst with subsequent alkali treatment.

Ethers of this type are derived, for example, from acyclic alcohols, such as ethylene glycol, diethylene glycol and higher poly(oxyethylene) glycols, propane-1,2-diol, or poly(oxypropylene) glycols, propane-1,3-diol, butane-1,4-diol, poly(oxytetramethylene) glycols, pentane-1,5-diol, hexane-1,6-diol, sorbitol, and from polyepichlorohydrins.

However, they are also derived, for example, from cycloaliphatic alcohols such as 1,3- or 1,4-dihydroxycyclohexane, bis(4-hydroxycyclohexyl) methane, 2,2-bis(4-hydroxycyclohexyl)-propane or 1,1-bis(hydroxymethyl)cyclohex-3-ene, or they possess aromatic nuclei, such as N,N-bis(2-hydroxyethyl) aniline or p,p'-bis(2-hydroxyethylamino) diphenylmethane.

The epoxides can also be derived from mononuclear phenols, such as, for example, from resorcinol, pyrocatechol or hydroquinone; or they are based on polynuclear phenols such as, for example, on 4,4'-dihydroxybiphenyl, bis(4-hydroxphenyl)methane, 2,2-bis(4-hydroxyphenyl)propane, 2,2-bis(4-hydroxyphenyl)hexafluoropropane, 2,2-bis(3,5-dibromo-4-hydroxyphenyl)propane, 4,4'-dihydroxydiphenyl sulfone, 9,9'-bis(4-hydroxyphenyl) fluorene, or on condensation products of phenols with formaldehyde, obtained under acidic conditions, such as phenol novolaks.

3. Di(N-glycidyl) compounds are obtainable, for example, by dehydrochlorination of the reaction products of epichlorohydrin with amines containing two amino hydrogen atoms. Examples of these amines are aniline, toluidine, n-butylamine, bis(4-aminophenyl)methane, m-xylylenediamine or bis(4-methylaminophenyl) methane.

Also included among the di(N-glycidyl) compounds, however, are N,N'-diglycidyl derivatives of cycloalkyleneureas, such as ethyleneurea or 1,3-propyleneurea, and N,N'-diglycidyl derivatives of hydantoins, such as of 5,5-dimethylhydantoin.

4. Di(S-glycidyl) compounds, such as di-S-glycidyl derivatives derived from dithiols, such as, for example, ethane-1,2-dithiol or bis(4-mercaptomethylphenyl) ether.

5. Epoxides with a radical of the formula II in which $R_{11}$ and $R_{13}$ together are —$CH_2CH_2$— and n is 0 are, for example, bis(2,3-epoxycyclopentyl) ether, 2,3-epoxycyclopentyl glycidyl ether or 1,2-bis(2,3-epoxycyclopentyloxy)ethane; an example of epoxides with a radical of the formula II in which $R_{11}$ and $R_{13}$ together are —$CH_2CH_2$— and n is 1 is (3',4'-epoxy-6'-methylcyclohexyl)methyl 3,4-epoxy-6-methylcyclohexanecarboxylate.

Owing, for example, to their preparation process, the abovementioned difunctional epoxides may include small amounts of mono- or trifunctional fractions.

Predominantly, use is made of diglycidyl compounds having aromatic structures.

If desired, it is also possible to employ a mixture of epoxides of different structures.

Examples of suitable difunctional epoxides are:
a) liquid bisphenol A diglycidyl ethers, such as Araldit® GY 240, Araldit® GY 250, Araldit® GY 260, Araldit® GY 266, Araldit® GY 2600 or Araldit® MY 790;
b) solid bisphenol A diglycidyl ethers, such as Araldit® GT 6071, Araldit® GT 7071, Araldit® GT 7072, Araldit® GT 6063, Araldit® GT 7203, Araldit® GT 6064, Araldit® GT 7304, Araldit® GT 7004, Araldit® GT 6084, Araldit® GT 1999, Araldit® GT 7077, Araldit® GT 6097, Araldit® GT 7097, Araldit® GT 7008, Araldit® GT 6099, Araldit® GT 6608, Araldit® GT 6609 or Araldit® GT 6610;
c) liquid bisphenol F diglycidyl ethers, such as Araldit® GY 281, Araldit® GY 282, Araldit® PY 302 or Araldit® PY 306;
d) liquid glycidyl ethers of alcohols, such as Shell® Glycidylether 162, Araldit® DY 0390 or Araldit® DY 0391;
e) liquid glycidyl esters of carboxylic acids, such as Shell® Cardura E terephthalic ester, trimellitic ester, Araldit® PY 284 or mixtures of aromatic glycidyl esters, for example Araldit® PT 910;
f) liquid cycloaliphatic epoxy resins such as Araldit® CY 179.

On the other hand, tri- and polyfunctional epoxides can be employed supplementarily, in order, if desired, to obtain branching sites. The amount of polyfunctional epoxides should generally be such as to avoid crosslinking of the polyamide. Crosslinking of the polyamide leads to a worsening in the properties of the polyamide. A tetrafunctional epoxide will generally be employed in a lower concentration than a trifunctional epoxide. Examples of suitable tri- and polyfunctional epoxides are:
a) solid polyglycidyl ethers of tetraphenylethane, such as CG Epoxy Resin® 0163;
b) solid and liquid polyglycidyl ethers of phenol-formaldehyde novolak, such as EPN 1138, EPN 1139, GY 1180, PY 307;
c) solid and liquid polyglycidyl ethers of o-cresole-formaldehyde novolak, such as ECN 1235, ECN 1273, ECN 1280, ECN 1299;
d) solid heterocyclic epoxy resins (triglycidyl isocyanurate), such as Araldit® PT 810;
e) liquid N,N,O-triglycidyl ethers of p-aminophenol, such as Araldit® MY 0510;
f) tetraglycidyl-4,4'-methylenebenzamine or N,N,N',N'-tetraglycidyldiaminophenylmethane, such as Araldit® MY 720, Araldit® MY 721.

Particularly preferred difunctional epoxides are liquid or low-melting diglycidyl ethers based on bisphenols such as, for example, on 2,2-bis(4-hydroxyphenyl)propane (bisphenol A) or mixtures of bis(ortho/para-hydroxyphenyl) methane (bisphenol F).

Very particular preference is given to epoxides of the bisphenol A diglycidyl ether type, for example: Araldit® GT 6071, GT 7071, GT 7072, or epoxides of the bisphenol F type, such as Araldit® GY 281 or PY 306; diglycidyl 1,2-cyclohexanedicarboxylate, e.g. Araldit® PY 284; or phenol novolak epoxy resin, e.g. Araldit® PY EPN 1139.

The process can be carried out in any vessels which can be heated and are fitted with a stirring device. These may, for example, be closed apparatus from which atmospheric oxygen is excluded, working for example under an inert gas atmosphere such as nitrogen, or else with vacuum degassing. The process is preferably conducted in an extruder.

The polyamide material to be heated and the mixture comprising a secondary aromatic amine and a difunctional epoxide are normally charged to the apparatus at the beginning of heating; however, subsequent metered addition of the novel mixture to the polyamide is a further option, it being possible to add the mixture as such or else to add the individual components in any desired sequence. Heating at above the melting point or glass transition point is generally carried out until the novel mixture is in a state of homogeneous distribution. Homogeneous distribution can be effected, for example, by stirring or kneading. The temperature depends on the polyamide used. In the case of crystalline polyamides, the process is preferably carried out in the range between the melting point and a temperature of about 50° C. above the melting point. In the case of amorphous polyamides, the process is advantageously conducted, for instance, in the region of 50° C. and 150° C. above the respective glass transition temperature.

For their addition, the secondary aromatic amine and the difunctional epoxide can, independently of one another, be present in the form of a liquid, powder, granules or in compacted form, or else on a carrier material such as silica gel, for example, together with a polymer powder or wax, for example a polyethylene wax, or as a concentrate, for example in a masterbatch. The secondary aromatic amine and the difunctional epoxide are preferably added in liquid form.

For each 100 parts of polyamide, it is preferred to employ from 0.01 to 5 parts of a secondary aromatic amine and from 0.01 to 10 parts of a difunctional epoxide. In this context, particular preference is given to the use of from 0.05 to 5 parts, especially from 0.05 to 2 parts, of a secondary aromatic amine, and from 0.05 to 5 parts, especially from 0.05 to 2 parts, of a difunctional epoxide.

In this reaction, the amount of secondary aromatic amine and difunctional epoxide can be used, in dependence on the initial molecular weight of the polyamide, to control the desired final molecular weight. The present novel process therefore makes it possible for polyamides to be tailored.

The novel process has the advantage that the increase in molecular weight and/or viscosity is achieved in short reaction times, and the additives, for example the secondary aromatic amine and the difunctional epoxide, can be added in liquid form. The novel process also has the advantage that the polyamide undergoes no additional discolouration. The combination of secondary aromatic amines with difunctional epoxides leads synergistically to the build up in the molecular weight of virgin polyamide or recycled polyamide, while retaining the linear chain structure.

In addition to the mixture of a secondary aromatic amine and a difunctional epoxide, stabilizers can be added to the polyamide. These stabilizers are generally known to the skilled worker and are chosen depending on the specific requirements regarding the end product. In particular it is possible to add light stabilizers or else antioxidants (R. G ächter, H. Müller, Hanser Verlag, "Plastics Additives Handbook, 3rd Ed.", especially pages 82 to 85 and 255 to 258 (1990)). Those which are particularly suitable are:

1. Antioxidants
Esters of β(3,5-di-tert-butyl-4-hydroxyphenyl)propionic Acid
with mono- or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.2. Esters of β-(5-tert-butyl-4-hydroxy-3-methylphenyl) propionic Acid
with mono- or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.3. Esters of β-(3,5-dicyclohexyl-4-hydroxyphenyl) propionic Acid
with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)-oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.4. Esters of 3,5-di-tert-butyl-4-hydroxyphenylacetic Acid
with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.5. Amides of β-(3,5-di-tert-butyl-4-hydroxyphenyl) propionic Acid
e.g. N,N'-bis(3,5-di-tert-butyl-4-hydroxyphenylpropionyl)hexamethylenediamine, N,N'-bis(3,5-di-tert-butyl-4-hydroxyphenylpropionyl) trimethylenediamine, N,N'-bis(3,5-di-tert-butyl-4-hydroxyphenylpropionyl)-hydrazine.

1.6. Tocopherols
for example α-tocopherol, β-tocopherol, γ-tocopherol, δ-tocopherol and mixtures thereof (vitamin E).

Among these, preferred antioxidants are those of the type lrganox® 1098 (N,N'-bis(3,5-di-tert-butyl-4-hydroxyphenylpropionyl)hexamethylenediamine) or Irganox® 245 (ester of 3,5-di-tert-butyl-4-hydroxyphenyl acetic acid with triethylene glycol), preferably in combination with aromatic phosphites or phosphonites (see item 3).

2. UV-absorbers and Light Stabilizers
2.1. 2-(2'-Hydroxyphenyl)benzotriazoles
for example 2-(2'-hydroxy-5'-methylphenyl)-benzotriazole, 2-(3',5'-di-tert-butyl-2'-hydroxyphenyl) benzotriazole, 2-(5'-tert-butyl-2'-hydroxyphenyl) benzotriazole, 2-(2'-hydroxy-5'-(1,1,3,3-tetramethylbutyl) phenyl)-benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octoxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)-benzotriazole, a mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)-benzotriazole, 2-(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl) phenylbenzotriazole, 2,2'-methylenebis[4-(1,1,3,3-tetramethylbutyl)-6-benzotriazol-2-ylphenol]; the transesterification product of 2-[3'-tert-butyl-5'-(2-methoxycarbonylethyl)-2'-hydroxyphenyl]benzotriazole with polyethylene glycol 300; [R—CH$_2$CH$_2$—COO—CH$_2$CH$_2$]$_{\overline{2}}$
where R=3'-tert-butyl-4'-hydroxy-5'-2H-benzotriazol-2-ylphenyl.

2.2. 2-Hydroxybenzophenones
for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivative.

2.3. Esters of Substituted or Unsubstituted Benzoic Acids for example 4-tert-butyl-phenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates for example ethyl α-cyano-β,β-diphenylacrylate or isooctyl α-cyano-β,β-diphenylacrylate, methyl α-carbomethoxycinnamate, methyl α-cyano-β-methyl-p-methoxy-cinnamate or butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel Compounds for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of monoalkyl esters, such as of the methyl or ethyl ester, of 4-hydroxy-3,5-di-tert-butylbenzylphosphonic acid, nickel complexes of ketoximes, e.g. of 2-hydroxy-4-methylphenyl undecyl ketoxime, nickel complexes of 1-phenyl-4-lauroyl-5-hydroxypyrazole, with or without additional ligands.

2.6. Sterically Hindered Amines for example bis(2,2,6,6-tetramethylpiperidin-4-yl) sebacate, bis(2,2,6,6-tetramethylpiperidin-4-yl) succinate, bis(1,2,2,6,6-pentamethylpiperidin-4-yl) sebacate, bis(1-octyloxy-2,2,6,6-tetramethylpiperidin-4-yl) sebacate, bis(1,2,2,6,6-pentamethylpiperidyl) n-butyl 3,5-di-tert-butyl-4-hydroxybenzylmalonate, the condensate of 1-hydroxyethyl-2,2,6,6-tetramethyl-4-hydroxypiperidine and succinic acid, the condensate of N,N'-bis-(2,2,6,6-tetramethyl-4-piperidyl) hexamethylenediamine and 4-tert-octylamino-2,6-dichloro-1,3,5-s-triazine, tris(2,2,6,6-tetramethyl-4-piperidyl) nitrilotriacetate, tetrakis(2,2,6,6-tetramethyl-4-piperidyl) 1,2,3,4-butanetetraoate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl) malonate, 3-n-octyl-7,7,9,9-tetramethyl-1,3,8-triazaspiro[4.5]decane-2,4-dione, bis(1-octyloxy-2,2,6,6-tetramethylpiperidyl) sebacate, bis(1-octyloxy-2,2,6,6-tetramethyl-piperidyl) succinate, the condensate of N,N'-bis(2,2,6,6-tetramethyl-4-piperidyl)-hexamethylenediamine and 4-morpholino-2,6-dichloro-1,3,5-triazine, the condensate of 2-chloro-4,6-di(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]-decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, the condensate of N,N'-bis(2,2,6,6-tetramethyl-4-piperidyl)-hexamethylenediamine and 4-cyclohexylamino-2,6-dichloro-1,3,5-triazine, the condensate of 1,2-bis(3-aminopropylamino)ethane and 2,4,6-trichloro-1,3,5-triazine, and also 4-butylamino-2,2,6,6-tetramethylpiperidine (CAS Reg. No. [136504-96-6]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4.5]decane, and the reaction product of 7,7,9,9-tetramethyl-2-cycloundecyl-1-oxa-3,8-diaza-4-oxospiro[4.5]decane and epichlorohydrin.

2.7. Oxalamides for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butyloxanilide and mixtures of o- and p-methoxy and of o- and p-ethoxy-disubstituted oxanilides.

2.8. 2-(2-Hydroxyphenyl)-1,3,5-triazines for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-[2-hydroxy-4-(2-hydroxy-3-octyloxypropyloxy)-phenyl]-4,6-bis(2,4-dimethylphenyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine.

3. Phosphites and Phosphonites for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,6-di-tert-butyl-4-methylphenyl) pentaerythritol diphosphite, bisisodecyloxypentaerythritol diphosphite, bis(2,4-di-tert-butyl-6-methylphenyl) pentaerythritol diphosphite, bis-(2,4,6-tri-tert-butylphenyl) pentaerythritol diphosphite, tristearyl sorbitol triphosphite, tetrakis(2,4-di-tert-butylphenyl) 4,4'-biphenylene-diphosphonite, 6-isooctyloxy-2,4,8,10-tetra-tert-butyl-12H-dibenzo-[d,g]-1,3,2-dioxaphosphocin, 6-fluoro-2,4,8,10-tetra-tert-butyl-12-methyl-dibenzo[d,g]-1,3,2-dioxaphosphocin, bis(2,4-di-tert-butyl-6-methylphenyl) methyl phosphite, bis(2,4-di-tert-butyl-6-methylphenyl) ethyl phosphite.

Particular preference is given to the following phosphites: tris(2,4-di-tert-butylphenyl) phosphite (Irgafos® 168, Ciba-Geigy), tris(nonylphenyl) phosphite,

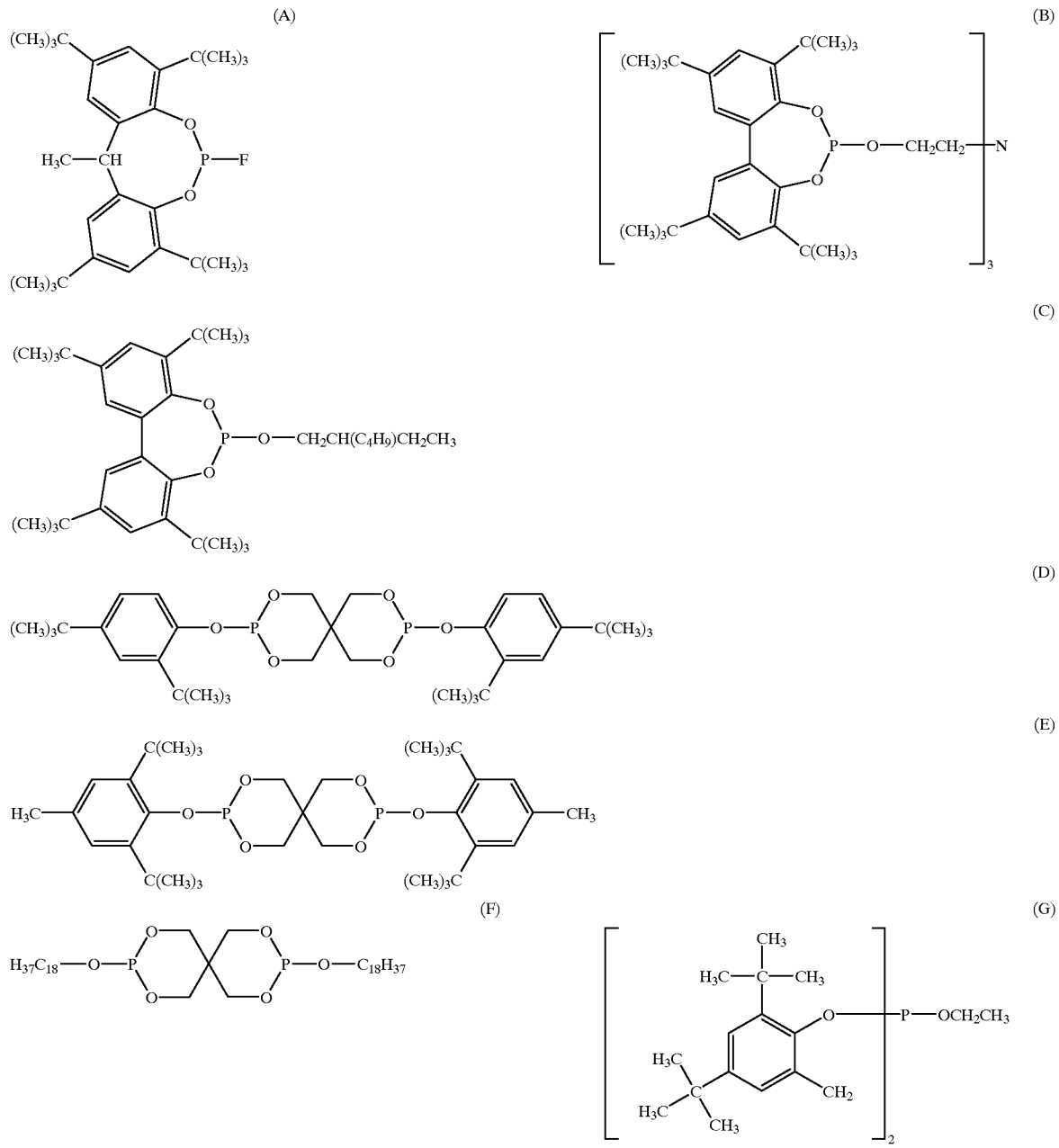

Very particular preference is given to tris(2,4-di-tert-butylphenyl) phosphite [Irgafos® 168, Ciba-Geigy], bis(2,4-di-tert-butyl-6-methylphenyl) ethyl phosphite (Irgafos® 38, Ciba-Geigy, formula (G)] and 2,2',2"-nitrilo[triethyl tris(3,3',5,5'-tetra-tert-butyl-1,1'-biphenyl-2,2'-diyl) phosphite [Irgafos® 12, Ciba-Geigy, formula (B)].

4. Polyamide Stabilizers for example copper salts in combination with iodides and/or phosphorus compounds and salts of divalent manganese.

5. Fillers and Reinforcing Agents for example calcium carbonate, silicates, glass fibres, glass balls, asbestos, talc, kaolin, mica, barium sulfate, metal oxides and hydroxides, carbon black, graphite, wood flour and flours or fibres of other natural products, and synthetic fibres.

6. Other Additives for example plasticizers, lubricants, emulsifiers, pigments, rheology additives, catalysts, levelling agents, optical brighteners, flameproofing agents, antistatic agents, blowing agents.

The additional additives and/or stabilizers are added to the polyamide in concentrations, for example, of from 0.01 to 10%, based on the overall weight of the polyamide.

Among such additives, preference is given to light stabilizers from classes 2.1, 2.6 and 2.7, for example light stabilizers of the type Chimassorb® 944, Chimassorb® 119, Tinuvin® 234, Tinuvin® 234, Tinuvin® 312, Tinuvin® 622 or Tinuvin® 770 and/or mixtures of low and/or high molecular mass HALS compounds, especially of at least two high molecular mass HALS compounds, for example the combination of Tinuvin® 622 and Chimassorb® 944. Preference is also given to aromatic phosphites or phosphonites.

Where the polyamide is a recyclate, it can also be employed mixed with virgin material or together with virgin material, for example in a coextrusion process.

It has additionally been found that the polyamide employed need not be predried, or not completely predried, for the novel process, which results in an economic advantage.

The invention additionally provides for the use of a mixture comprising a secondary aromatic amine and a difunctional epoxide for increasing the molecular weight and/or viscosity of virgin polyamide or recycled polyamide. The preferences regarding the use correspond to those for the process.

The invention also provides a composition comprising a) a virgin polyamide and/or recycled polyamide, b) a secondary aromatic amine, and c) a difunctional epoxide. The preferences regarding the compositions correspond to those for the process.

The invention also provides, furthermore, polyamides obtainable by the novel process.

The examples which follow illustrate the invention in more detail without limiting it thereto. As in the remainder of the description, parts and percentages are by weight unless stated otherwise.

EXAMPLE 1

Increasing the Molecular Weight and/or Viscosity of Polyamide 6

In a Plasticorder from Brabender with a W 50 mixing chamber a polyamide 6 (Durethan® B30 S from Bayer) is processed under nitrogen at a temperature of 235° C. and at 40 revolutions/minute with the additives indicated in Table 1. The torque of the polyamide is determined after 10, 20 and 30 minutes. The greater the number, the higher the molecular weight. After 30 minutes the melt index (MFR) is measured (at 235° C. under 2.16 kg in accordance with ISO 1133). A large increase in the melt index denotes severe chain degradation, i.e. a reduction in molecular weight. The results are compiled in Table 1.

TABLE 1

| | | Torque [Nm] after | | | Melt |
|---|---|---|---|---|---|
| Example | Additives | 10 min | 20 min | 30 min | index [g/10 min] |
| 1a[d] | — | 2.8 | 3.1 | 2.6 | 47.0 |
| 1b[d] | 0.50% Irganox ®5057[a] | 3.0 | 3.9 | 4.3 | 18.8 |
| 1c[d] | 0.50% Araldit ®PY 306[b] | 6.3 | 6.7 | 6.6 | 13.6 |
| 1d[e] | 0.50% Irganox ®5057[a] 0.50% Araldit ®PY 306[b] | 4.8 | 6.8 | 8.3 | 6.4 |
| 1e[e] | 1.00% Irganox ®5057[a] 1.00% Araldit ®PY 306[b] | 11.4 | 13.1 | 15.2 | 0.9 |
| 1f[e] | 0.20% Irganox ®5057[a] 0.50% Araldit ®PY 306[b] | 7.1 | 8.4 | 9.0 | 7.7 |
| 1g[e] | 0.50% Amine X[c] 0.50% Araldit ® PY 306[b] | 5.9 | 7.1 | 8.9 | 7.3 |

[a]Irganox ®5057 (Ciba-Geigy) is 4,4'-di-tert-octyl-diphenylamine (see formula 1e).
[b]Araldit ®PY 306 (Ciba-Geigy) is a liquid epoxide of the bisphenol-F-diglycidyl ether type [diglycidyl ether of bis(ortho/para-hydroxyphenyl)-methane (bisphenol F)].
[c]Amine X is N,N'-diphenyl-p-phenylendiamine (see formula 1f).
[d]Comparison examples.
[e]Novel examples.

EXAMPLE 2

Increasing the Molecular Weight and/or Viscosity of Polyamide 6

In a Plasticorder from Brabender with a W 50 mixing chamber a polyamide 6 (Durethan® B30 S from Bayer) is processed under nitrogen at a temperature of 245° C. and at 40 revolutions/minute with the additives indicated in Table 2. The torque of the polyamide is determined after 10, 20 and 30 minutes. The greater the number, the higher the molecular weight. After 30 minutes the melt index (MFR) is measured (at 235° C. under 2.16 kg in accordance with ISO 1133). A large increase in the melt index denotes severe chain degradation, i.e. a reduction in molecular weight. The results are compiled in Table 2.

TABLE 2

| | | Torque [Nm] after | | | Melt |
|---|---|---|---|---|---|
| Example | Additives | 10 min | 20 min | 30 min | index [g/10 min] |
| 2a[f] | — | 2.4 | 2.1 | 1.5 | 58.3 |
| 2b[f] | 0.50% Irganox ®5057[a] | 2.3 | 2.8 | 3.6 | 20.3 |
| 2c[g] | 0.50% Irganox ®5057[a] 0.50% Araldit ®PY 284[b] | 4.6 | 5.7 | 5.9 | 8.6 |
| 2d[g] | 0.50% Irganox ®5057[a] 0.50% Araldit ®PY 306[c] 0.10% Araldit ®EPN 1139[d] | 6.1 | 6.0 | 6.6 | 5.6 |
| 2e[g] | 0.20% Irganox ®5057[a] 0.50% Araldit ®GY 260[e] | 3.8 | 4.2 | 4.8 | 8.6 |

[a]Irganox ®5057 (Ciba-Geigy) is 4,4'-di-tert-octyldiphenylamine (see formula 1e).
[b]Araldit ®PY 284 (Ciba-Geigy) is diglycidyl 1,2-cyclohexanedicarboxylate.
[c]Araldit ®PY 306 (Ciba-Geigy) is a liquid epoxide of the bisphenol F diglycidyl ether type [diglycidyl ether of bis(ortho/para-hydroxyphenyl) methane (bisphenol F)].
[d]Araldit ®EPN 1139 (Ciba-Geigy) is a liquid phenol novolak epoxy resin, epoxide content 5.6–6.8 equivalents/kg.
[e]Araldit ®GY 260 (Ciba-Geigy) is a liquid epoxide of the bisphenol A diglycidyl ether type [diglycidyl ether of 2,2-bis(4-hydroxyphenyl)propane (bisphenol A).
[f]Comparison examples.
[g]Novel examples.

EXAMPLE 3

Increasing the Molecular Weight and/or Viscosity of Polyamide 6.6

On a twin-screw extruder TW 200 from Haake, a polyamide 6.6 (Durethan® A 30 S from Bayer) is processed at a temperature of 290° C. and at 40 revolutions/minute with the additives indicated in Table 3. After 30 minutes, the melt index (MFR) is measured (at 235° C. under 2.16 kg in accordance with ISO 1133). A large increase in the melt index denotes severe chain degradation, i.e. a reduction in molecular weight. The results are compiled in Table 3.

TABLE 3

| Example | Additives | Melt index [g/10 min] |
|---|---|---|
| 3a[c] | — | 63. |
| 3b[d] | 0.20% Irganox ®5057[a] 0.50% Araldit ®PY 306[b] | 18.0 |

[a]Irganox ®5057 (Ciba-Geigy) is 4,4'-di-tert-octyldiphenylamine (see formula 1e).
[b]Araldit ®PY 306 (Ciba-Geigy) is a liquid epoxide of the bisphenol F diglycidyl ether type [diglycidyl ether of bis(ortho/para-hydroxyphenyl) methane (bisphenol F)].
[c]Comparison example.
[d]Novel example.

What is claimed is:

1. A process for increasing the molecular weight and/or viscosity of polyamides, which comprises heating a polyamide, with the addition of a secondary aromatic amine and of a difunctional epoxide, at above the melting point or glass transition point of the polyamide.

2. A process according to claim 1, wherein both the secondary aromatic amine and the difunctional epoxide are in liquid form.

3. A process according to claim 1, wherein the polyamide is a recycled polyamide (recyclate).

4. A process according to claim 1, wherein the secondary aromatic amine is a compound of the formula I

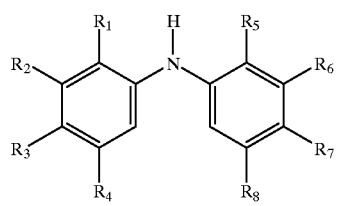

in which
$R_1$ is hydrogen or $C_1$–$C_{25}$alkyl,
$R_2$ is hydrogen, $C_1$–$C_{25}$alkyl or benzyl,
$R_3$ is hydrogen, $C_1$–$C_{25}$alkyl, $C_5$–$C_{12}$cycloalkyl, benzyl, α-methylbenzyl or α,α-dimethylbenzyl;
or $R_2$ and $R_3$ together form a divalent group

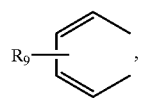

$R_4$ is hydrogen, $C_1$–$C_{25}$alkyl or benzyl,
$R_5$ is hydrogen or $C_1$–$C_{25}$alkyl,
$R_6$ is hydrogen, $C_1$–$C_{25}$alkyl or benzyl,
$R_7$ is hydrogen, $C_1$–$C_{25}$alkyl, $C_5$–$C_{12}$cycloalkyl, benzyl, α-methylbenzyl, α,α-dimethylbenzyl

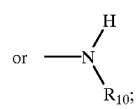

or $R_6$ and $R_7$ together form a divalent group

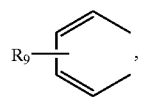

$R_8$ is hydrogen, $C_1$–$C_{25}$alkyl or benzyl,
$R_9$ is hydrogen or $C_1$–$C_{25}$alkyl, and
$R_{10}$ is $C_5$–$C_{12}$cycloalkyl

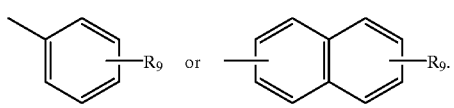

5. A process according to claim 4, wherein
$R_1$ and $R_2$ independently of one another are hydrogen or $C_1$–$C_{18}$alkyl,
$R_3$ is hydrogen, $C_1$–$C_{18}$alkyl, $C_5$–$C_8$cycloalkyl, benzyl, α-methylbenzyl or α,α-dimethylbenzyl;

or $R_2$ and $R_3$ together form a divalent group

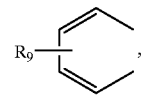

$R_4$, $R_5$ and $R_6$ independently of one another are hydrogen or $C_1$–$C_{18}$alkyl,
$R_7$ is hydrogen, $C_1$–$C_{18}$alkyl, $C_5$–$C_8$cycloalkyl, benzyl, α-methylbenzyl, α,α-dimethylbenzyl

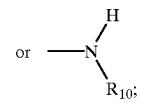

or $R_6$ and $R_7$ together form a divalent group

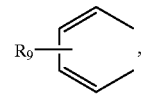

$R_8$ and $R_9$ independently of one another are hydrogen or $C_1$–$C_{18}$alkyl, and
$R_{10}$ is $C_5$–$C_8$cycloalkyl,

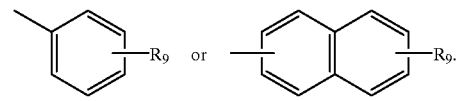

6. A process according to claim 4, wherein $R_1$, $R_4$, $R_5$, $R_6$ and $R_8$ are hydrogen.

7. A process according to claim 4, wherein
$R_1$ and $R_2$ are hydrogen,
$R_3$ is hydrogen, $C_4$–$C_{12}$alkyl, cyclohexyl, benzyl, α-methylbenzyl or α,α-dimethylbenzyl; or $R_2$ and $R_3$ together form a divalent group

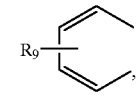

$R_4$, $R_5$ and $R_6$ are hydrogen,
$R_7$ is hydrogen, $C_4$–$C_{12}$alkyl, cyclohexyl, benzyl, α-methylbenzyl or α,α-dimethylbenzyl or

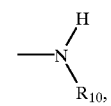

$R_8$ and $R_9$ are hydrogen, and
$R_{10}$ is cyclohexyl, phenyl or β-naphthyl.

8. A process according to claim 4, wherein
$R_1$, $R_2$, $R_4$, $R_5$, $R_6$ and $R_8$ are hydrogen,
$R_3$ is hydrogen or $C_8$alkyl, $R_7$ is $C_8$alkyl or

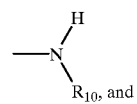

$R_{10}$ is phenyl.

9. A process according to claim 1, wherein the difunctional epoxide is a compound which comprises epoxide radicals of the formula II

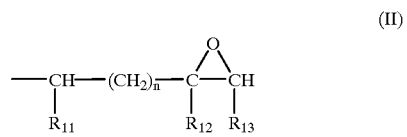

which are attached directly to carbon, oxygen, nitrogen or sulfur atoms, and wherein $R_{11}$ and $R_{13}$ are both hydrogen, $R_{12}$ is hydrogen or methyl and n is 0; or wherein $R_{11}$ and $R_{13}$ together are —$CH_2CH_2$— or —$CH_2CH_2CH_2$—, $R_{12}$ is then hydrogen, and n is 0 or 1.

10. A process according to claim 1, wherein the difunctional epoxide is bisphenol A diglycidyl ether, bisphenol F diglycidyl ether, diglycidyl 1,2-cyclohexanedicarboxylate or phenol novolak epoxy resin.

11. A process according to claim 1, wherein from 0.01 to 5 parts of the secondary aromatic amine and from 0.01 to 10 parts of the difunctional epoxide are used per 100 parts of polyamide.

12. A process according to claim 1, wherein polyamide 6 or polyamide 6.6 or a mixture thereof is employed as polyamide.

* * * * *